(12) United States Patent
Wang (10) Patent No.: US 11,010,865 B2
(45) Date of Patent: May 18, 2021

(54) IMAGING METHOD, IMAGING APPARATUS, AND VIRTUAL REALITY DEVICE INVOLVES DISTORTION

(71) Applicant: GoerTek Technology Co., Ltd., Qingdao (CN)

(72) Inventor: Ming Wang, Shandong (CN)

(73) Assignee: GOERTEK TECHNOLOGY CO. LTD., Qinqdao (CN)

( * ) Notice: Subject to any disclaimer, the term of this patent is extended or adjusted under 35 U.S.C. 154(b) by 0 days.

(21) Appl. No.: 16/425,226

(22) Filed: May 29, 2019

(65) Prior Publication Data

US 2019/0318449 A1 Oct. 17, 2019

Related U.S. Application Data

(63) Continuation of application No. PCT/CN2016/111541, filed on Dec. 22, 2016.

(30) Foreign Application Priority Data

Dec. 7, 2016 (CN) .......................... 201611118112.2

(51) Int. Cl.
*G06T 3/00* (2006.01)
*G06F 19/00* (2018.01)
*G06T 19/00* (2011.01)

(52) U.S. Cl.
CPC ............ *G06T 3/005* (2013.01); *G06T 19/006* (2013.01); *G06T 2200/04* (2013.01); *G06T 2200/08* (2013.01)

(58) Field of Classification Search
CPC ............... G06T 19/006; G06T 2200/04; G06T 2200/08; G06T 3/005; G06T 5/006; G06T 3/0018; G06T 19/003
See application file for complete search history.

(56) References Cited

U.S. PATENT DOCUMENTS

| 2006/0119906 A1* | 6/2006 | Park ........................ G06T 5/006 358/488 |
| 2008/0088740 A1* | 4/2008 | Kondo .................. H04N 7/0122 348/556 |
| 2010/0079487 A1* | 4/2010 | Wang .................... G06T 3/0012 345/628 |
| 2012/0099081 A1* | 4/2012 | Huang ................. G03B 21/005 353/30 |

(Continued)

FOREIGN PATENT DOCUMENTS

CN 204101815 U * 1/2015

OTHER PUBLICATIONS

CN-204101815-U (Machine Translation on Mar. 18, 2020) (Year: 2015).*

*Primary Examiner* — Michael Le
(74) *Attorney, Agent, or Firm* — Baker Botts, L.L.P.

(57) ABSTRACT

An imaging method for a virtual reality device, and a virtual reality device are provided. The method comprises: acquiring an image; calculating the radius of a minimum inscribed circle of the image; calculating a distortion ratio at the minimum inscribed circle according to the radius and a selected distortion formula; enlarging the image by using the calculated distortion ratio as an enlargement ratio; distorting the enlarged image according to the distortion formula; and outputting the distortion processed image to a screen for displaying.

10 Claims, 5 Drawing Sheets

(56) References Cited

U.S. PATENT DOCUMENTS

2015/0363921 A1* 12/2015 Baek .................... G06K 9/522
                                                            348/241
2017/0192236 A1* 7/2017 Chen .................... G09G 5/006
2018/0213153 A1* 7/2018 Iso ..................... H04N 5/23267

* cited by examiner

IMAGING METHOD, IMAGING APPARATUS, AND VIRTUAL REALITY DEVICE INVOLVES DISTORTION

CROSS-REFERENCE TO RELATED APPLICATIONS

This application is a Continuation Application of international Application No. PCT/CN2016/111541, filed on Dec. 22, 2016, which claims priority to Chinese Patent Application No. 201611118112.2, filed on Dec. 7, 2016, both of which are hereby incorporated by reference in their entireties.

TECHNICAL FIELD

The present disclosure relates to the field of virtual reality technology, and more particularly, the present disclosure relates to an imaging method for a virtual reality device, an imaging apparatus for a virtual reality device and a virtual reality device.

BACKGROUND

The virtual reality (VR) technology is the system simulation of interactive 3D dynamic visions and physical behaviors of multi-source information fusion so as to immerse users in the environment. Therefore, a core structure of a virtual reality device is an optical display system comprising a display device and a lens device. Light output by the display device is incident to retinas of human eyes through the lens device to form a virtual enlarged image, thereby providing the immersive experience.

For the display device and the lens device of the virtual reality device, lens parameters and a screen size are changed with product setting requirements. In this case, in order to realize that the image can enter into a visual field of a user in an original ratio, and that a proper visual field of a lens module is occupied on a screen, it is necessary to adjust a final imaging ratio according to the screen size and the lens parameters.

In order to obtain immersive experience, various manufacturers pursue for a relatively large field angle, that is, the scope of the screen viewed through the lens device is required to be as large as possible. At present, the visible scope of the lens device is generally determined as a minimum inscribed circle of the screen. By taking a narrow screen as an example, the minimum inscribed circle is tangent to two vertical display borders of the screen. By taking a wide screen as another example, the minimum inscribed circle is tangent to two transverse display borders of the screen.

SUMMARY

According to a first aspect of the present disclosure, there is provided an imaging method for a virtual reality device, comprising: acquiring an image; calculating the radius of a minimum inscribed circle of the image; calculating a distortion ratio at the minimum inscribed circle according to the radius and a selected distortion formula; enlarging the image by using the calculated distortion ratio as an enlargement ratio; distorting the enlarged image according to the distortion formula; and outputting the distorted image to a screen for displaying.

According to a second aspect of the present disclosure, there is provided an imaging apparatus for a virtual reality device, comprising: an image acquiring module configured to acquire an image; a radius calculating module configured to calculate the radius of a minimum inscribed circle of the image; a ratio calculating module configured to calculate a distortion ratio at the minimum inscribed circle as an enlargement ratio of the image according to the radius and a selected distortion formula; an enlargement processing module, configured to enlarge the image according to the enlargement ratio provided by the ratio calculating module; a distortion processing module configured to distort the enlarged image according to the distortion formula; and an output module configured to output the distorted image to a screen for displaying.

According to a third, aspect of the present disclosure, there is provided an imaging apparatus for a virtual reality device, comprising: a memory and a processor, wherein the memory is configured to store instructions for controlling the processor to operate to perform the imaging method according to the first aspect of the present disclosure.

According to a fourth aspect of the present disclosure, there is provided a virtual reality device, comprising the imaging apparatus according to the second aspect of the present disclosure or the third aspect of the present disclosure.

According to a fifth aspect of the present disclosure, there is provided a computer readable storage medium, storing program codes configured to perform the imaging method according to the first aspect of the present disclosure.

Other features and advantages of the present disclosure will become apparent from the following description of exemplary embodiments of the present disclosure with reference to the accompanying drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION

Various exemplary embodiments of the present disclosure will now be described with reference to the drawings. It should be noted that the relative arrangement of the components and steps, the numerical expressions, and numerical values set forth in these embodiments do not limit the scope of the present disclosure.

The following description of at least one exemplary embodiment is merely illustrative in nature and is in no way intended to limit the disclosure, its application, or uses.

Techniques, methods and apparatus as known by one of ordinary skill in the relevant art may not be discussed but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In order to enable the user to view a flat image by the lens module, the original image needs to be distorted, during imaging, but the distorting causes the image displaying on the screen to be compressed toward a center point. Hence, in order to achieve the purpose of imaging the content of the image just in the visible scope defined by the minimum inscribed circle, it is necessary to enlarge the image before the distorting, FIG. 1 shows a schematic flowchart of some embodiments of an imaging method for a virtual reality device according to the present disclosure.

Figure 1:
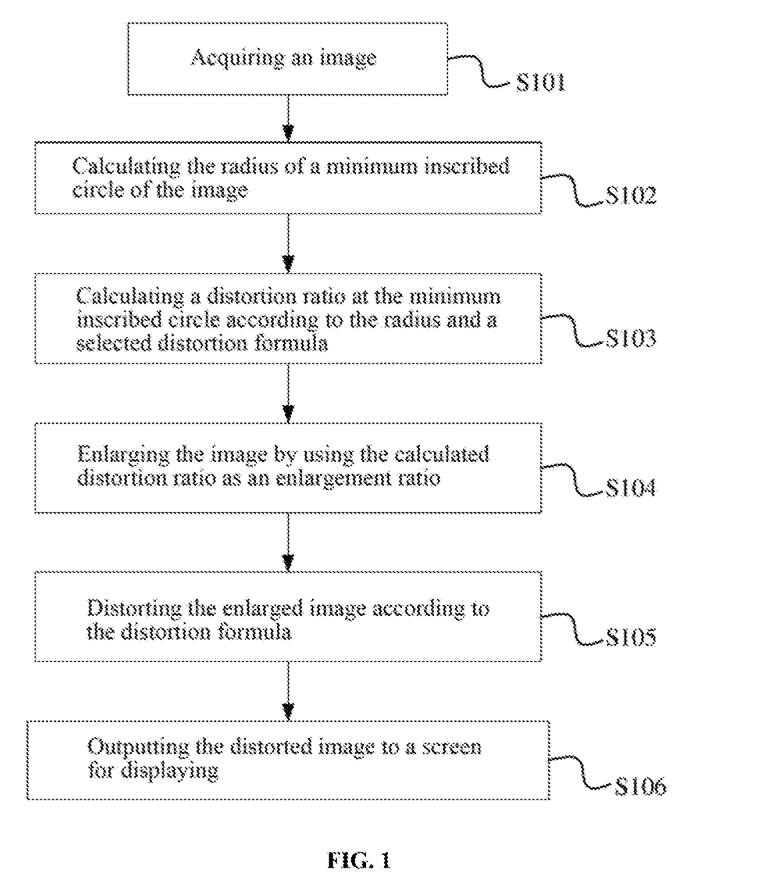
FIG. 1 is a schematic flowchart of some embodiments of an imaging method according to the present disclosure.

According to FIG. 1, the imaging method may comprise the following steps.

In step S101, an image is acquired.

The image is an original image and carries the picture content for displaying. The method according to the present disclosure is also the imaging method which processes the original image, so that the processed image can present a proper imaging ratio on the screen.

The image has an aspect ratio per se, and the aspect ratio of the image may be 1, or may be greater than 1 or less than 1.

In step S102, the radius of a minimum inscribed circle of the image is calculated.

In the embodiment in which the aspect ratio of the image is 1, the image has only one inscribed circle. Therefore, step S102 may further comprise: calculating a distance from a midpoint of any side of the image to a geometric center of the image, such distance being equal to half of the width or height of the image.

In an embodiment in which the aspect ratio of the image is greater than 1, step S102 may further comprise: calculating the radius to be equal to half of the height of the image.

In the embodiment in which the aspect ratio of the image is less than 1, step S102 may further comprise: calculating the radius to be equal to half of the width of the image.

In step S103, a distortion ratio of the image at the minimum inscribed circle calculated according to the calculated radius and a selected distortion formula.

The distortion formula is configured to calculate the distortion ratio of each pixel point on the image, and the image is distorted accordingly, thereby enabling the user to view a flat image by a lens device.

By taking the distortion formula commonly used in the VR field as an example: $\beta = K0 + K1 \times r + K2 \times r^2 + K3 \times r^3 + K4 \times r^4 + K5 \times r^5 + K6 \times r^6$, wherein $K0$ to $K6$ an real coefficient, specific values of which depend on the characteristics of a lens of the lens device, and $\beta$ is the distortion ratio of a pixel point, the distance from which to the geometric center of the image is r, on the image.

According to the distortion formula, it can be known that the farther away from the geometric center of the image is, the larger the distortion rate is, and the larger a corresponding required enlargement ratio is. Therefore, the distortion ratio obtained by introducing the radius of the minimum inscribed circle of the image into the distortion formula is the enlargement ratio which can achieve the optimal imaging. That is, the image is enlarged by the distortion ratio, so that the distorted image can be presented in the visual field of the lens device according to the optimal imaging ratio, that is, presented in the minimum inscribed circle of the screen.

In step S104, the calculated distortion ratio is used as the enlargement ratio to enlarge the image.

In step S105, the enlarged image is distorted according to the distortion formula.

It can be seen that the imaging method according to the present disclosure determines the enlargement ratio of the image before the distortion according to the distortion formula, and uses the same distortion formula to distort the enlarged image, it is equivalent to that the inverse variation of the distorting is used to perform enlargement of the image within the visible scope of the screen, so that the optimal screen imaging ratio can be achieved.

In step S106, the distorted image is output to the screen for display.

Since the aspect ratio of the image may be not the same as the aspect ratio of the screen, the image will be stretched according to an unequal ratio when the image is displayed by the screen, thereby resulting in distortion of the final displayed image.

Figure 2:
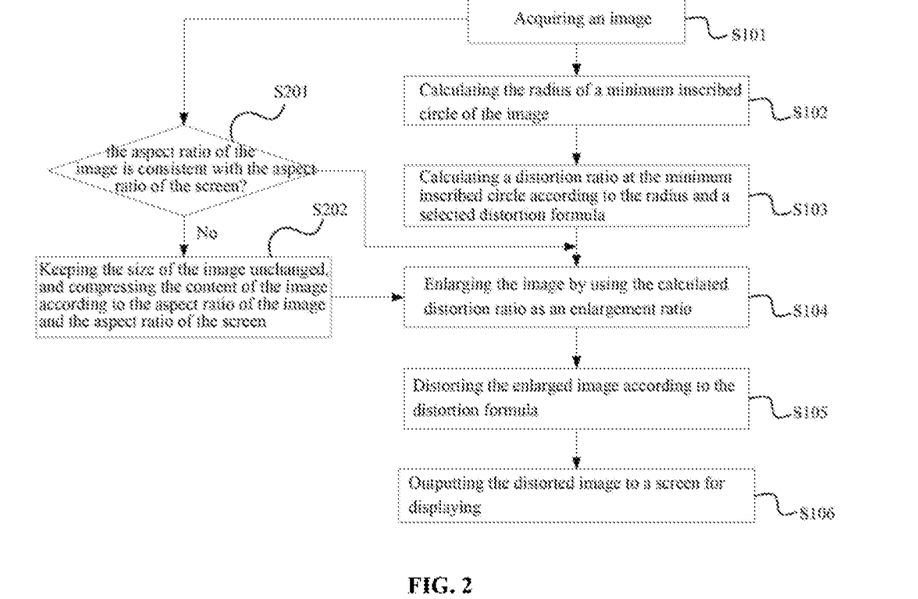
FIG. 2 is a schematic flowchart of other embodiments of the imaging method according to the present disclosure.

In order to improve the quality of the picture display, FIG. 2 shows other embodiment of the imaging method according to the present disclosure.

In the present embodiment, the imaging method according to the present disclosure further comprises the following steps.

In step S201, before the image is enlarged, whether the aspect ratio of the image is consistent with the aspect ratio of the screen is judged, if not, step S202 is performed, and the above step S104 is directly performed.

In step S202, the size of the image is kept unchanged, and a minimum degree of compression is performed on the content of the image according to the aspect ratio of the image and the aspect ratio of the screen, so that the content of the image is displayed on the screen as large as possible according to the original ratio (i.e., the aspect ratio of the image), that is, the aspect ratio of the content of the image on the screen is consistent with the aspect ratio of the image per se, thereby achieving a display result without distortion.

By taking $\lambda_2$ as an example of the aspect ratio of the image, and $\lambda_2$ as an example of the aspect ratio of the screen, the aspect ratio of the content of the compressed image is $\lambda_3 = \lambda_1^2 / \lambda_2$, formula (1).

Since the aspect ratio of the image is mostly 1 for the VR scene, the step of compressing the content if the image is explained by taking 1 as an example of the aspect ratio of the image.

Figure 3A:
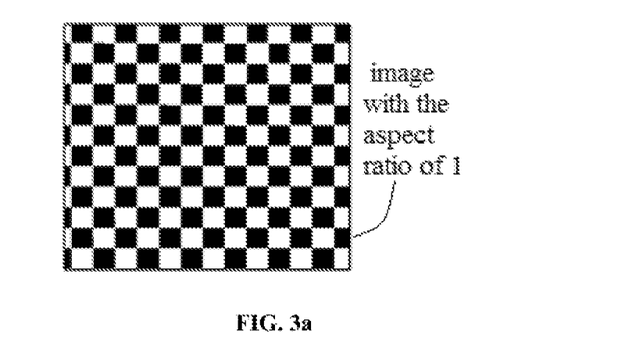
FIG. 3a shows an image with the aspect ratio of 1.
Figure 3B:
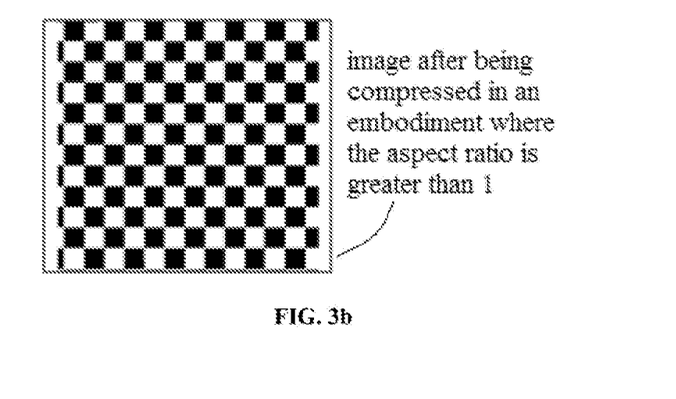
FIG. 3b shows an example of the content of the image of FIG. 3a after being compressed in an embodiment where the aspect ratio of a screen is greater than 1.
Figure 3C:
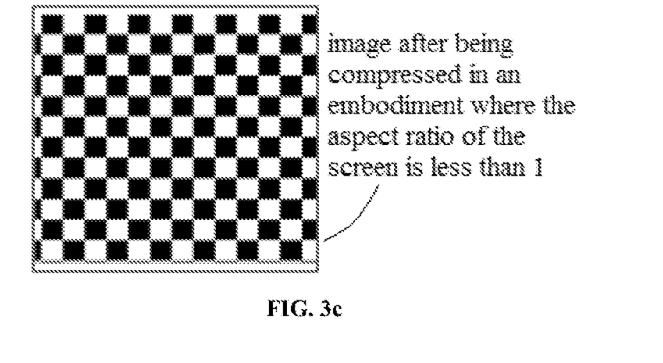
FIG. 3c shows an example of the content of the image of FIG. 3a after being compressed in an embodiment where the aspect ratio of the screen is less than 1.

FIG. 3a is an image with the aspect ratio of 1. FIG. 3b shows an example of the image of FIG. 3a after being compressed in an embodiment where the aspect ratio of the screen is greater than 1. FIG. 3c shows an example of the image of FIG. 3a after being compressed in an embodiment where the aspect ratio of the screen is less than 1.

The embodiment corresponding to FIG. 3b is a case where the aspect ratio of the screen is greater than 1, that is, the screen is a wide screen. In the present embodiment, according to formula (1), the aspect ratio of the content of the compressed image is less than 1. Therefore, in order to achieve the compression of minimum degree, the height of the content of the image may be kept unchanged, and the width of the content of the image is compressed according to the reciprocal of the aspect ratio of the screen.

The compressed example is as shown in FIG. 3b. The image has blank spaces at both ends in the width direction, which is usually reflected as black edges at the left and right ends in practice.

The embodiment corresponding to FIG. 3c is the case where the aspect ratio of the screen is less than 1, that is, the screen is a high screen. In the present embodiment, according to formula (1), it can be known that the aspect ratio of the content of the compressed image is greater than 1. Therefore, in order to achieve the compression of the minimum degree, the width of the content of the image may be kept unchanged, and the height of the content of the image is compressed according to the aspect ratio of the screen.

The compressed, example is as shown in FIG. 3c. The image has blank spaces at both ends in the height direction, which is usually reflected as black edges at the upper and lower ends in practice.

EXAMPLES

The aspect ratio of the image is 1, as shown in FIG. 3a, and the aspect ratio of the screen is 4/5.

According to the imaging method shown in FIG. 2,

Firstly, the enlargement ratio K of the image is calculated according to steps S102 and S103.

Then, the content of the image is compressed according to step S202 to perform size adaption with the screen. For example, in the case where the size of the image is kept unchanged, the width of the content of the image is kept unchanged, and the height of the content of the image is compressed by to 4/5, so that the image is changed to the image shown in FIG. 3c.

The image subjected to size adaption is then enlarged according to the enlargement ratio K.

Then, the enlarged image is subjected to the distorting.

Figure 4:
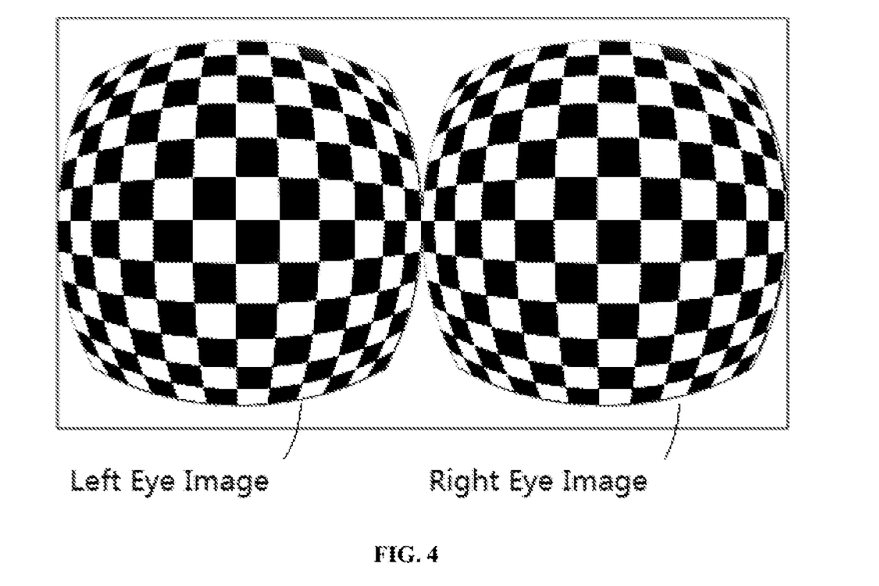
FIG. 4 is a display view of the embodiment shown in FIG. 3c.

Finally, the distorted image is output to the screen for displaying. HQ, 4 shows the final display result, and black outer borders in the figure is the display borders of the screen.

In the embodiment shown in FIG. 4, the left eye image and the right eye image are displayed in a left portion and a right portion of the screen. It can be considered that the left half portion of the screen is the left eye screen for displaying the left eye image, and the right half portion of the screen is the right eye screen for displaying the right eye image. In other embodiments, two separate screens may also be taken as the left eye screen and the right eye screen respectively. The screen illustrated in the imaging method according to the present disclosure is the left eye screen or the right eye screen.

According to FIG. 4, the final display result is that the left eye image and the right eye image are finally displayed as the inscribed circles corresponding to the screen portions with the width as a standard, and the display of the optimal imaging ratio is further achieved based on the maximum visual field.

Figure 5:
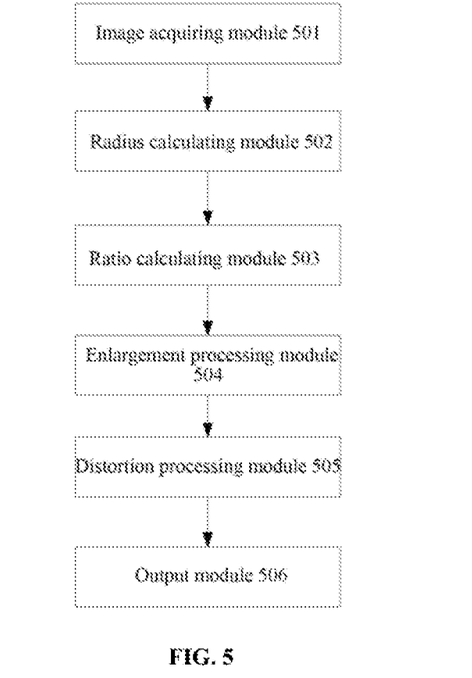
FIG. 5 is a block schematic diagram of some embodiments of an it raging apparatus according to the present disclosure.

The present disclosure further provides an imaging apparatus for a virtual reality, device. NG, 5 is a block schematic diagram of some embodiments of an imaging apparatus.

As shown in FIG. 5, the imaging apparatus comprises an image acquiring module 501, a radius calculating module 502, a ratio calculating module 503, an enlargement processing module 504, a distortion processing module 505 and an output module 506.

The image acquiring module 501 is configured to acquire an image.

The radius calculating module 502 is configured to calculate the radius of a minimum inscribed circle of the image.

The ratio calculating module 503 is configured to calculate a distortion ratio at the minimum inscribed circle as an enlargement ratio of the image according to the radius and a selected distortion formula.

The enlargement processing module 504 is configured to enlarge the image according to the enlargement ratio provided by the ratio calculating module.

The distortion processing module 505 is configured to distort the enlarged image according to the distortion formula.

The output module 506 is configured to output the distorted image to a screen for display.

The radius calculating module 502 is further configured to calculate the radius to be equal to the distance from the midpoint of any side of the image to the geometric center of the image in the case that the aspect ratio of the image is 1.

The radius calculating module 502 is further configured to calculate the radius to be, equal to half of the height of the image in the case that the aspect ratio of the image is greater than 1.

The radius calculating module 502 is further configured to calculate the radius to be equal to half of the width of the image in the case that the aspect ratio of the image is less than 1.

The distortion formula adopted by the above ratio calculating module 503 and the distortion processing module 505 may be, for example, $\beta = K0 + K1 \times r + K2 \times r^2 + K3 \times r^3 + K4 \times r^4 + K5 \times r^5 + K6 + r^6$, wherein K0 to K6 are real coefficients, and $\beta$ is the distortion ratio of a pixel point, the distance from which to the geometric center of the image is r, on the image.

Figure 6:
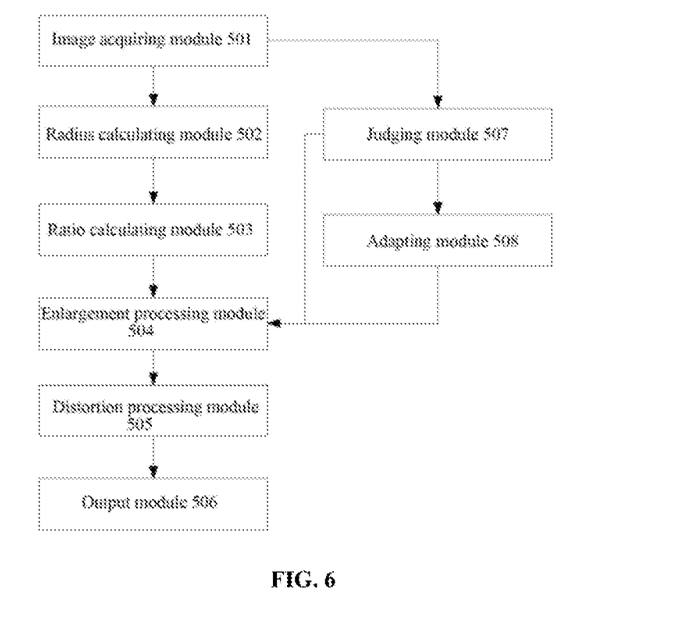
FIG. 6 is a block schematic diagram of other embodiments of the imaging apparatus according to the present disclosure.

FIG. 6 is a block schematic diagram of other embodiments of an imaging apparatus according to the present disclosure.

According to FIG. 6, the imaging apparatus may further comprise a judging module 507 and an adapting module 508.

The judging module 507 is configured to judge whether the aspect ratio of the image is consistent with the aspect ratio of the screen before the enlargement processing module 504 enlarges the image, and output a judging result.

The adapting module 508 is configured to keep the size of the image unchanged when the judging result is inconsistent, and perform the compression of the minimum degree on the content of the image according to the aspect ratio of the image and the aspect ratio of the screen and then provide the same to the enlargement processing module 504 for enlargement processing, so that the content of the image is displayed on the screen in an original ratio.

The above adapting module 508 is further configured to keep the height of the content of the image unchanged, and compress the width of the content of the image according to the reciprocal of the aspect ratio of the screen in the case that the aspect ratio of the image is 1, and the aspect ratio of the screen is greater than 1.

The above adapting module 508 is further configured to keep the width of the content of the image unchanged, and empress the height of the content of the image according to the aspect ratio of the screen in the case that the aspect ratio of the image is 1, and the aspect ratio of the screen is less than 1.

Figure 7:
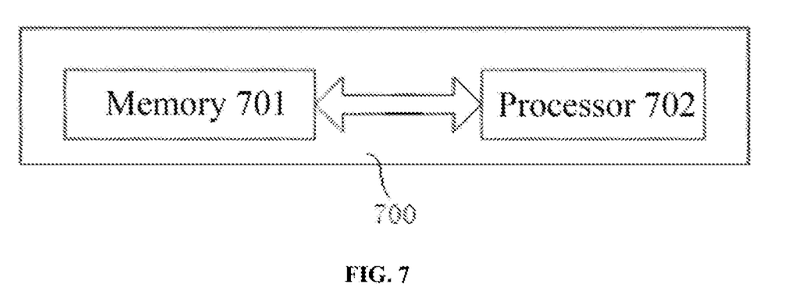
FIG. 7 is a block schematic diagram of a hardware structure of the imaging apparatus according to the present disclosure.

FIG. 7 shows a harsh are structure of some embodiments of the imaging apparatus.

According to FIG. 7, the imaging apparatus 700 may comprise a memory 701 and a processor 702. The memory 701 is configured to store instructions, and the instructions are configured to control each processor 702 to operate to perform the imaging method according to the present disclosure.

Figure 8:
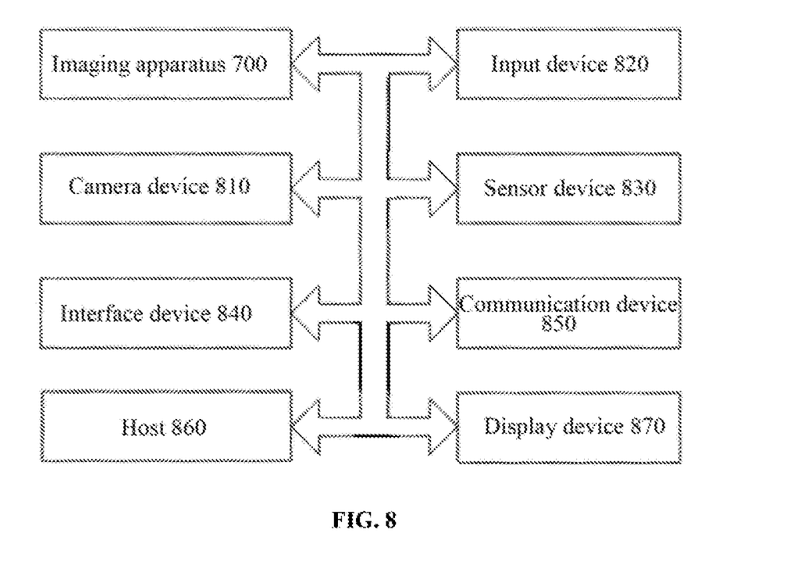
FIG. 8 is a block schematic diagram of an implementing structure of a virtual reality device according to the present disclosure.

FIG. 8 is a block schematic diagram of some embodiments of a virtual reality device according to the present disclosure.

According to FIG. 8, the virtual reality, device comprises the imaging apparatus according to the present disclosure, such as the imaging apparatus 700 shown in FIG. 7.

In addition, the virtual reality device may further comprise a camera device 810, an input device 820, a sensor device 830 an interface device 840, a communication device 850, a host 860, a display device 870, and the like.

The above camera device 810 is configured to collect the infrared light emitted by an infrared device on a peripheral such as a helmet or a handle, thereby realizing spatial positioning and tracking.

The above input device 820 may comprise, for example, a touch screen, a button, and the like.

The above sensor device 830 may comprise, but not limited to, at least one of the following, an acceleration sensor, a gyroscope, a GPS tracker, an ultrasonic range finder, a pressure sensor, an altimeter, a camera, a magnetometer, a tilt sensor, and the like according to the moving posture to be acquired.

The above interface device 840 comprises, for example, a USB interface, a network port, and the like.

The above communication device 850 can perform, for example, wired or wireless communication.

The above host 860 is a control center of the virtual reality device, and may be disposed on a headset portion or on a handheld device communicatively connected to the headset portion, or may be a fixed PC.

The above display device 870 comprises a screen and associated components and is disposed headset portion of the virtual reality device.

The various embodiments in the present specification are described in a progressive manner, the same or similar parts between the various embodiments may be referred to each other, and each embodiment focuses on the differences from other embodiments. However, it should be apparent to those skilled in the art that the above embodiments can be used individually or in combination with each other as needed. In addition, the device embodiments correspond to the method embodiments, and are thus described in a relatively simple manner, and the relevant parts can refer to the description of the corresponding parts of the method embodiments. The above device embodiments are merely illustrative, and the modules illustrated as separate components may be or may not be physically separate.

The present disclosure may be a system, a method, and/or a computer program product. The computer program product may comprise a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, comprising an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider). In some embodiments, electronic circuitry comprising, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus, and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved, it will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present disclosure is defined by the attached claims.

The invention claimed is:

1. An imaging method for a virtual reality device, comprising:
   acquiring an image by at least one sensor;
   calculating, by a processor in communication with the sensor, a radius of a minimum inscribed circle of the image;
   calculating, by the processor, a distortion ratio at the minimum inscribed circle according to the radius and a selected distortion formula, wherein the distortion formula is $\tau 3 = K0 + K1 \times r + K2 \times r^2 + K3 \times r^3 + K4 \times r^4 + K5 \times r^5 + K6 \times r^6$, wherein K0 to K6 are real coefficients, and $\beta$ is a distortion ratio of a pixel point on the image, r is a distance from which to a geometric center of the image;
   substituting, by the processor, the distance r for the distortion ratio at the minimum inscribed circle;
   enlarging, by the processor, the image as a distortion process by using the distortion ratio $\beta$ calculated from the formula as an enlargement ratio;
   distorting, by the processor, the enlarged image according to the selected distortion formula, as a counter distortion process after the distortion process; and
   outputting, by the processor, a distorted image to a screen for display.

2. The imaging method according to claim 1, wherein the calculating the radius of a minimum inscribed circle of the image comprises:
   when an aspect ratio of the image is 1, calculating the radius to be equal to a distance from a midpoint of any side of the image to a geometric center of the image.

3. The imaging method according to claim 2, further comprising:
   judging whether the aspect ratio of the image is consistent with the aspect ratio of the screen before enlarging the image, if not, and then:
   keeping a size of the image unchanged, and compressing the content of the image according to the aspect ratio of the image and the aspect ratio of the screen, so that the content of the image is displayed on the screen in an original ratio.

4. The imaging method according to claim 3, wherein the compressing the content of the image according to the aspect ratio of the image and the aspect ratio of the screen comprises:
   when the aspect ratio of the image is 1 and the aspect ratio of the screen is greater than 1, keeping a height of the content of the image unchanged and compressing a width of the content of the image according to the reciprocal of the aspect ratio of the screen; and
   when the aspect ratio of the image is 1 and the aspect ratio of the screen is less than 1, keeping the width of the content of the image unchanged and compressing the height of the content of the image according to the aspect ratio of the screen.

5. A non-transitory computer readable storage medium, storing instructions configured to perform the imaging method according to claim 1.

6. A virtual reality device, comprising:
   a sensor configured to acquire an image;
   at least one processor, operatively coupled to the sensor, and adapted to:
   calculate a radius of a minimum inscribed circle of the image;

calculate a distortion ratio at the minimum inscribed circle as an enlargement ratio of the image according to the radius and a selected distortion formula, wherein the distortion formula is $\beta=K0+K1\times r+K2\times r^2+K3\times r^3+K4\times r^4+K5\times r^5+K6\times r^6$, wherein K0 to K6 are real coefficients, and $\beta$ is a distortion ratio of a pixel point on the image, r is a distance from which to a geometric center of the image;

substitute the distance r for the distortion ratio at the minimum inscribed circle;

enlarge the image as a distortion process by using the distortion ratio $\beta$ calculated from the formula as an enlargement ratio; and distort the enlarged image according to the selected distortion formula to thereby generate a processed image, as a counter distortion process after the distortion process; and a display, operatively coupled to the processor, to display a distorted image.

7. The virtual reality device according to claim 6, wherein the radius calculating module is further configured to:

when an aspect ratio of the image is 1, calculate the radius to be equal to a distance from a midpoint of any side of the image to a geometric center of the image.

8. The virtual reality device according to claim 7, wherein the processor is further configured to:

judge whether the aspect ratio of the image is consistent with the aspect ratio of the screen before the enlargement processing module enlarges the image, and output a judging result; and when the judging result is the aspect ratio of the image is not consistent with the aspect ratio of the screen, keep the size of the image unchanged, compress the content of the image according to the aspect ratio of the image and the aspect ratio of the screen such that the content of the image is displayed on the screen in an original ratio.

9. The virtual reality device according to claim 6, wherein the processor is further adapted to:

judge whether the aspect ratio of the image is consistent with the aspect ratio of the screen before the enlargement processing module enlarges the image, and output a judging result; and when the judging result is the aspect ratio of the image is not consistent with the aspect ratio of the screen, keep a size of the image unchanged, compress the content of the image according to the aspect ratio of the image and the aspect ratio of the screen such that the content of the image is displayed on the screen in an original ratio.

10. The virtual reality device according to claim 9, wherein the processor is further configured to:

when the aspect ratio of the image is 1 and the aspect ratio of the screen is greater than 1, keep a height of the content of the image unchanged and compress a width of the content of the image according to the reciprocal of the aspect ratio of the screen; and when the aspect ratio of the image is 1 and the aspect ratio of the screen is less than 1, keep the width of the content of the image unchanged and compress the height of the content of the image according to the aspect ratio of the screen.

* * * * *